(12) United States Patent
Bergman et al.

(10) Patent No.: US 6,257,728 B1
(45) Date of Patent: Jul. 10, 2001

(54) COLOR PROJECTION SYSTEM

(75) Inventors: Anthonie H. Bergman, Eindhoven (NL); Serge J. A. Bierhuizen, Wilsonville, OR (US); Jeffrey A. Shimizu, Cortlandt Manor, NY (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/552,648

(22) Filed: Apr. 19, 2000

(30) Foreign Application Priority Data

Apr. 23, 1999 (EP) .................................................. 99201287

(51) Int. Cl.⁷ ........................... G03B 21/00; G03B 21/14; G02F 1/1335; H04N 9/12
(52) U.S. Cl. .............................. 353/31; 353/38; 353/84; 349/108; 348/743
(58) Field of Search .................................. 353/31, 38, 84, 353/101; 349/5, 7, 106, 108, 109; 348/742, 743

(56) References Cited

U.S. PATENT DOCUMENTS 5,467,206 * 11/1995 Loiseaux et al. ...................... 359/40
5,650,832 * 7/1997 Poradish et al. ...................... 348/743

FOREIGN PATENT DOCUMENTS 454093    2/1992 (JP) .................................. H04N/9/31

* cited by examiner

*Primary Examiner*—Russell Adams
*Assistant Examiner*—Magda Cruz

(57) ABSTRACT

Color projection system includes a light source, an integrator plate arranged in front of the light source and having a plurality of juxtaposed lens elements, an electro-optical light modulation panel arranged in front of the integrator plate, a projection lens preceding the light modulation panel, and a movable color filter which is provided with a plurality of parallel extending, differently colored strips. The color filter is located opposite the integrator plate, which color filter and integrator plate are movable relative to each other in a direction extending parallel to the integrator plate, while at least two differently colored strips are located opposite each lens element, while strips of the same color have the same position with respect to each lens element.

6 Claims, 2 Drawing Sheets

COLOR PROJECTION SYSTEM

BACKGROUND OF THE INVENTION

The invention relates to a color projection system comprising at least a light source, at least an integrator plate arranged in front of the light source and comprising a plurality of juxtaposed lens elements, an electro-optical light modulation panel arranged in front of the integrator plate, at least a projection lens preceding the light modulation panel, and a movable color filter which is provided with a plurality of parallel extending, differently colored strips.

In such a color projection system known from JP-A-4.54093 (Toshiba Corporation), the color filter precedes the light modulation panel. The color filter has at least three differently colored strips. The colors of the strips are red, blue and green. The color filter is moved in front of the light modulation panel while simultaneously a part of the image to be projected corresponding to the color of the color strip facing the relevant part is generated on each portion of the light modulation panel. By moving the color filter relatively quickly and simultaneously adapting the parts of the image to be projected, which parts are generated on the light modulation panel, the red, blue and green part of the image is generated on each part of the light modulation panel and projected through the oppositely located colored strip and the projection lens. By projecting the three different colors of an image rapidly one behind the other, a fully colored image is observed by the human eye.

It is an advantage of such a color projection system that only one light modulation panel needs to be used.

However, it is a drawback of such a color projection system that the color filter is located in the imaging portion so that the color filter must have a sufficient optical quality, while it must be moved relatively very accurately and must be mechanically stable so as to ensure a qualitatively satisfactory projected image. Moreover, each colored strip should be moved through a relatively large distance of the complete light modulation panel.

SUMMARY OF THE INVENTION

It is an object of the invention to provide a relatively compact color projection system in which the color filter is positioned in a simple manner between the light source and the light modulation panel, while, moreover, the color projection system is relatively insensitive to inaccuracies of the color filter.

In the color projection system according to the invention, this object is achieved in that the color filter is located opposite the integrator plate, the color filter and integrator plate being movable relative to each other in a direction extending parallel to the integrator plate, while at least two differently colored strips are located opposite each lens element, strips of the same color having the same orientation with respect to each lens element.

As it were, the same color filter having a plurality of colored strips is thus located opposite each lens element. The light beams exiting from the lens elements of the integrator plate are integrated to a light spot imaged on the light modulation panel, which light spot, dependent on the colored strips located opposite the lens elements, has a structure corresponding thereto. The parts of the image to be projected, associated with the colored portions, are generated on the light modulation panel.

An inaccuracy of a single colored strip opposite a single lens element will have a relatively small influence on the eventual light spot imaged on the light modulation panel. Since a lens element is relatively small with respect to the light modulation panel, the distance through which the color filter must be moved per image to be fully projected is relatively small. This relatively small movement can be performed in a relatively simple and accurate manner.

These and other aspects of the invention are apparent from and will be elucidated with reference to the embodiments described hereinafter.

BRIEF DESCRIPTION OF THE DRAWING

In the Figures, corresponding components are denoted by the same reference numerals.

DETAILED DESCRIPTION OF THE PREFERRED EMBODIMENTS

Figure 1:
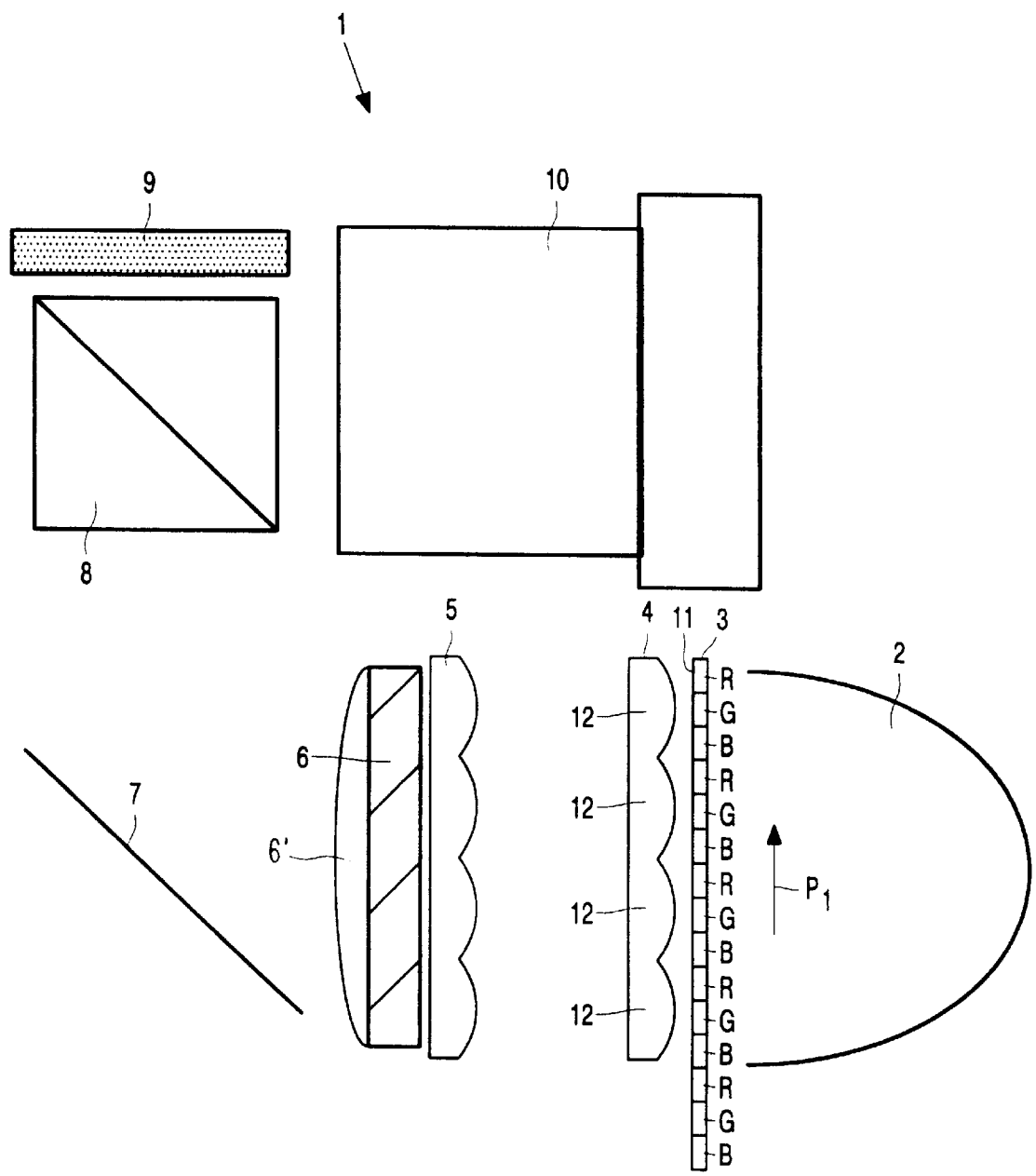
FIG. 1 is a diagrammatic side-elevational view of a color projection system according to the invention.

FIG. 1 shows diagrammatically a color projection system 1 according to the invention, comprising a light source 2, a color filter 3 arranged in front of the light source 2, a first integrator plate 4 arranged in front of the color filter 3, a second integrator plate 5 arranged in front of the first integrator plate 4, a PCS 6 (polarization conversion system) arranged in front of the second integrator plate 5, a lens 6' arranged in front of the PCS 6, a folding mirror 7 arranged in front of the lens 6, a PBS (polarization beam splitter) 8 preceding this mirror, a light modulation panel 9 arranged opposite said mirror and a projection lens 10 arranged opposite the PBS 8.

The color filter 3 comprises a plurality of parallel strips 11 alternately colored red (R), green (G) and blue (B), with the same plurality of strips in the same color sequence being located opposite each lens element 12 of the first integrator plate 4. As it were, the same mini color filter is located opposite each lens element 12. In the position of the color filter 3 shown in FIG. 1, three colored strips 11 are located opposite each lens element 12. In the color projection system shown in FIG. 1, the total number of colored strips 11 of the color filter 3 is the number N of juxtaposed lens elements 12 increased by 1 (=N+1) and subsequently multiplied by 3. This means that the number of colored strips is (4+1)×3=15 for four lens elements 12. The color filter 3 is movable in, and opposite to, a direction, denoted by arrow P1, parallel to the integrator plate 4. By displacing the color filter 3 in or opposite to the direction denoted by arrow P1, the positions of the color strips located opposite a lens element 12 will change. However, this change will be identical for each lens element 12.

The operation of the color projection system 1 shown in FIG. 1 will now be briefly elucidated. A light beam is directed towards the integrator plate 4 by the light source 2. This light beam will be split by the color filter 3 into a plurality of superposed, red (R), green (G) and blue (B) colored strips. These colored light beams subsequently pass through the integrator plate 4 and are concentrated to a beam in the lens 6 after passage through the integrator plate 5 and the PCS 6. The lens elements 12 of the integrator plate 4 are imaged one on the other on the light modulation panel 9, so that the light spot imaged on the light modulation panel 9 has a strip-shaped color structure which corresponds to the light beam exiting from each lens element 12 of the integrator plate 4. Simultaneously, an image comprising the parts of the image to be projected which are relevant to the colors concerned is generated on the light modulation panel 9. The image generated on the light modulation panel 9 is subsequently imaged on a projection screen by means of the projection lens 10. The color filter 3 is subsequently moved gradually in the direction denoted by arrow P1 so that the red, green and blue colored strip will successively be located opposite each part of the lens element 12. The image generated on the light modulation panel is adapted accordingly. After the color filter 3 has been moved upwards through a distance which is equal to the height of three strips, the color filter 3 is relatively quickly moved in a direction opposite to arrow P1, whereafter the color filter 3 can be moved again in the direction denoted by arrow P1. By moving the color filter 3 in this way, and by simultaneously and synchronously adapting the image generated on the light modulation panel 9, the red, green and blue part of an entire image can be successively projected relatively quickly. The human eye will not observe the color separately but only see the total image.

Figure 2:
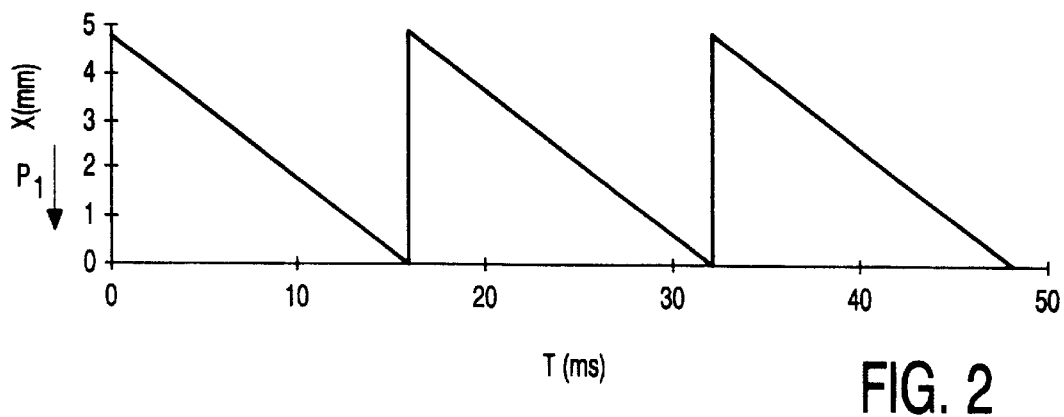
FIGS. 2–4 show different graphs in accordance with which the color filter of the color projection system shown in FIG. 1 can be moved.
Figure 3:
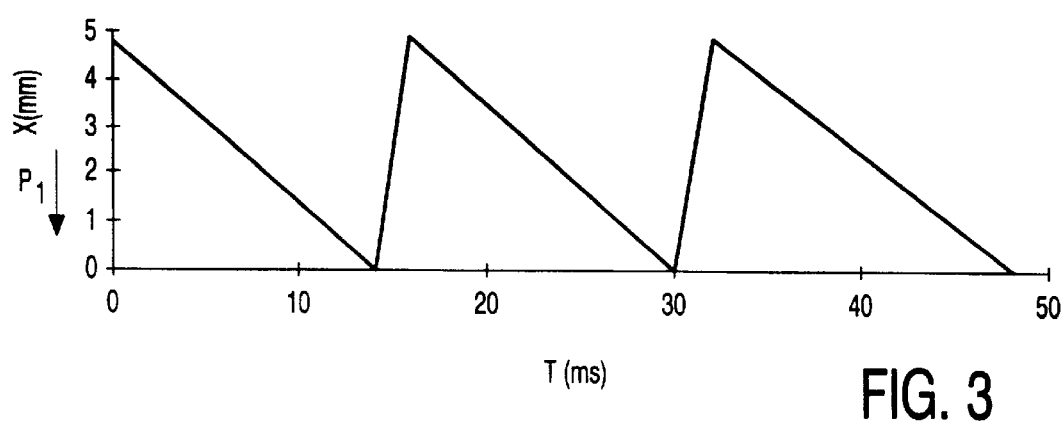
Figure 4:
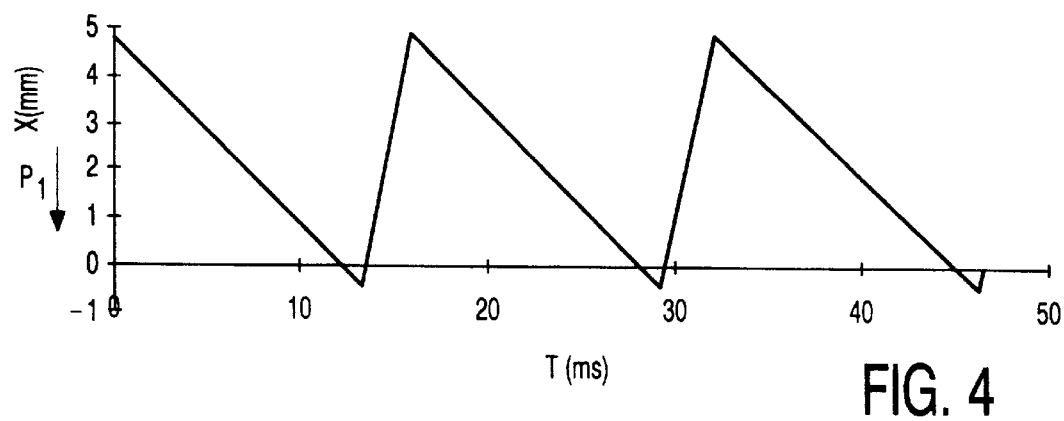

FIGS. 2–4 show different way s of moving the color filter 3 in and opposite to the direction denoted by arrow P1. In the graphs shown in FIGS. 2–4, the time T(ms) is plotted on the horizontal axis and the movement X (mm) performed in and opposite to the direction denoted by arrow P1 is plotted on the vertical axis. In the situation shown in FIG. 2, the color filter 3 is moved through approximately 5 mm within approximately 15 ms in the direction denoted by arrow P1, while subsequently the color filter 3 is moved back to the initial position in less than 1 ms. During movement of the color filter 3 in the direction opposite to arrow P1, no image is preferably generated on the light modulation panel so as to avoid color errors. It is alternatively possible to switch off or block the lamp 2 during this period of time.

In the course of movement shown in FIG. 3, the color filter 3 is moved more rapidly into the direction denoted by arrow P1 so that more time is available for moving the color filter in the direction opposite to arrow P1. This requires a faster change of images on the light modulation panel but allows a relatively simpler drive of the color filter 3. A further simplification of the drive of the color filter, for example by means of an excenter or piezo, is possible if the movement diagram shown in FIG. 4 is used.

It is alternatively possible to implement the color filter 3 as an endless strip which needs to be moved solely in the direction denoted by arrow P1. This has the advantage that the movement will be simpler, but has the drawback that the color filter 3 will become relatively large.

The color filter 3 must be located in the vicinity of the integrator plate 4. It is therefore also possible to move the color filter 3 to and from between the first and the second integrator plate 4, 5.

It is alternatively possible to move the integrator plate 4 instead of the color filter 3.

It is alternatively possible to use four colored strips, red-green-blue-white.

What is claimed is:

1. A color projection system comprising at least a light source, at least an integrator plate arranged in front of the light source and comprising a plurality of juxtaposed lens elements, an electro-optical light modulation panel arranged in front of the integrator plate, at least a projection lens preceding the light modulation panel, and a movable color filter which is provided with a plurality of parallel extending, differently colored strips, characterized in that the color filter is located opposite the integrator plate, the color filter and the integrator plate being movable relative to each other in a direction extending parallel to the plane of integrator plate, while at least two differently colored strips are located opposite each lens element, strips of the same color having the same orientation with respect to each lens element.

2. A color projection system as claimed in claim 1, characterized in that the color filter is movable in a first direction transverse to the colored strips and parallel to the integrator plate, and in a second direction opposite to the first direction.

3. A color projection system as claimed in claim 1 wherein a part of the light from the light source is passed by the colored strip, while the light not passing through the color filter is reflected back by the colored strip into the direction of the light source.

4. A color projection system as claimed in claim 1 wherein the color filter is movable in the second direction substantially faster than in the first direction.

5. A color projection system as claimed in claim 1 wherein the color filter is located between the light source and the integrator plate.

6. A color projection system as claimed in claim 1 wherein at least three differently colored strips are located opposite each lens element.

* * * * *